United States Patent
Bayat et al.

(10) Patent No.: US 10,901,543 B1
(45) Date of Patent: Jan. 26, 2021

(54) TOUCH SCREEN WITH TRANSPARENT ELECTRODE STRUCTURE

(71) Applicant: Apple Inc., Cupertino, CA (US)

(72) Inventors: Khadijeh Bayat, Santa Clara, CA (US); Isaac Wing-Tak Chan, Sunnyvale, CA (US); Cheng Chen, San Jose, CA (US); Avery P. Yuen, San Jose, CA (US); Rasmi R. Das, Sunnyvale, CA (US); Hienminh Huu Le, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/145,034

(22) Filed: Sep. 27, 2018

Related U.S. Application Data

(60) Provisional application No. 62/565,989, filed on Sep. 29, 2017, provisional application No. 62/644,768, filed on Mar. 19, 2018.

(51) Int. Cl.
*G06F 3/041* (2006.01)
*G06F 3/044* (2006.01)
(Continued)

(52) U.S. Cl.
CPC ............ *G06F 3/0412* (2013.01); *B32B 15/01* (2013.01); *G06F 3/044* (2013.01); *G06F 3/047* (2013.01);
(Continued)

(58) Field of Classification Search
CPC ........ G06F 3/0412; G06F 3/044; G06F 3/047; B32B 15/01; B32B 2307/202;
(Continued)

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| JP | 2000-163031 A | 6/2000 |
| JP | 2002-342033 A | 11/2002 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Peter D McLoone
(74) *Attorney, Agent, or Firm* — Kubota & Basol LLP

(57) ABSTRACT

Transparent conductors including a silver layer with high transparency and low sheet resistance are described. In some examples, the silver layer can be located between two transparent conductive oxide layers. The transparent conductor can further include additional transparent conductive oxide layers, optical layers, and/or additional conductive layers (e.g., layers including ITO or another fully or partially transparent conductive material), for example. In some examples, transparent conductors including a silver layer can be included in a touch screen device. For example, one or more shielding layers or one or more touch electrodes can include transparent conductors with a silver layer. In some examples, the silver layer can improve transparency, sheet resistance, and/or infrared reflection characteristics of the transparent conductor.

23 Claims, 12 Drawing Sheets

(51) Int. Cl.
*G06F 3/047* (2006.01)
*B32B 15/01* (2006.01)

(52) U.S. Cl.
CPC ... *B32B 2307/202* (2013.01); *B32B 2307/412* (2013.01); *B32B 2311/08* (2013.01); *B32B 2311/16* (2013.01); *B32B 2311/20* (2013.01)

(58) Field of Classification Search
CPC ........... B32B 2307/412; B32B 2311/08; B32B 2311/16; B32B 2311/20
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 9,557,871 B2 | 1/2017 | den Boer et al. | |
| 9,612,377 B2 | 4/2017 | Chen et al. | |
| 10,061,463 B2* | 8/2018 | Lee .................. | G06F 3/047 |
| 2006/0197753 A1 | 9/2006 | Hotelling | |
| 2007/0034954 A1* | 2/2007 | Cho .................. | H01L 27/12 |
| | | | 257/347 |
| 2012/0313881 A1* | 12/2012 | Ge .................. | G02F 1/13338 |
| | | | 345/174 |
| 2013/0004678 A1 | 1/2013 | Krasnov et al. | |
| 2013/0208204 A1* | 8/2013 | Jeon .................. | G02F 1/13338 |
| | | | 349/43 |
| 2013/0280879 A1* | 10/2013 | Stecher .............. | H01L 23/5225 |
| | | | 438/381 |
| 2014/0092324 A1 | 4/2014 | Kim et al. | |
| 2014/0170413 A1 | 6/2014 | Hassan et al. | |
| 2015/0009158 A1* | 1/2015 | Tsang ................ | G06F 3/0412 |
| | | | 345/173 |
| 2016/0259452 A1* | 9/2016 | Lee .................... | G06F 3/047 |
| 2017/0200526 A1 | 7/2017 | Guo et al. | |
| 2017/0269421 A1* | 9/2017 | Oka .................. | G02F 1/133305 |
| 2018/0175857 A1* | 6/2018 | Weber .............. | B32B 17/10036 |
| 2018/0350885 A1* | 12/2018 | Choi ................ | H01L 27/323 |
| 2019/0023610 A1* | 1/2019 | Fischer .............. | C03C 17/3649 |

FOREIGN PATENT DOCUMENTS

| | | |
|---|---|---|
| WO | WO-2016/126460 A2 | 8/2016 |
| WO | WO-2016/164427 A1 | 10/2016 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOUCH SCREEN WITH TRANSPARENT ELECTRODE STRUCTURE

CROSS REFERENCE TO RELATED APPLICATION

This application claims the benefit under 35 USC 119(e) of U.S. Provisional Patent Application No. 62/565,989, filed Sep. 29, 2017, the contents of which are incorporated herein by reference in their entirety for all purposes and of U.S. Provisional Patent Application No. 62/644,768, filed Mar. 19, 2018, the contents of which are incorporated herein by reference in their entirety for all purposes.

FIELD OF DISCLOSURE

This relates to transparent conductors, and in particular to transparent conductors including a silver layer with high transparency and low sheet resistance.

BACKGROUND OF THE INVENTION

Many types of input devices are presently available for performing operations in a computing system, such as buttons or keys, mice, trackballs, joysticks, touch sensor panels, touch screens, and the like. Touch screens, in particular, are popular because of their ease and versatility of operation as well as their declining price. Touch screens can include a touch sensor panel, which can be a transparent panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus, or other touch object at a location often dictated by a user interface (UI) being displayed by the display device. In general, touch screens can recognize a touch and the position of the touch on the touch sensor panel. The computing system can interpret the touch in accordance with one or more display images appearing at the time of the touch. The touch screen can perform one or more actions based on the touch. In the case of some touch screens, a physical touch on the display may not be needed to detect a touch. For example, in some capacitive-type touch screens, fringing electrical fields used to detect touch can extend beyond the surface of the display, and an touch object approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some example, the conductive plates can be formed from other materials including conductive polymers, metal mesh, graphene, nanowires (e.g., metallic nanowires) or nanotubes (e.g., carbon nanotubes). In order to detect such changes, in some examples, the touch electrodes can be coupled to sense circuitry using routing traces. It is due in part to their substantial transparency that some capacitive touch sensor panels can be overlaid on a display to form a touch screen. Some touch screens can be formed by at least partially integrating touch sensing circuitry into a display pixel stackup (i.e., a stack of material layers forming the display pixels). For example, touch screens can further include one or more shielding electrodes for mitigating the capacitive coupling of electrical noise to one or more touch sensing components (e.g., touch electrodes or routing traces) of the touch screen. In some examples, these one or more shielding electrodes can be formed from a highly conductive material (e.g., a material with low sheet resistance) to increase the efficacy of the shielding.

BRIEF SUMMARY OF THE DISCLOSURE

This relates to transparent conductors, and in particular to transparent conductors including a silver layer with high transparency and low sheet resistance. In some examples, transparent conductors including a silver layer can be incorporated into touch screen devices to form shielding electrodes and/or touch electrodes. The silver layer can be located between two oxide layers to protect the silver layer and improve transparency of an electrode including the transparent conductor, for example. In some examples, the electrode further includes additional layers, such as additional oxide layers, optical layers, and/or one or more transparent conductive layers (e.g., including ITO). The transparent conductors can be used as a continuous electrode or can be patterned to form patterned electrodes, for example.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to transparent conductors, and in particular to transparent conductors including a silver layer with high transparency and low sheet resistance. In some examples, transparent conductors including a silver layer can be incorporated into touch screen devices to form shielding electrodes and/or touch electrodes. The silver layer can be located between two oxide layers to protect the silver layer and improve transparency of an electrode including the transparent conductor, for example. In some examples, the electrode further includes additional layers, such as additional oxide layers, optical layers, and/or one or more transparent conductive layers (e.g., including ITO). The transparent conductors can be used as a continuous electrode or can be patterned to form patterned electrodes, for example.

FIGS. 1A-1D illustrate an example mobile telephone 136, an example media player 140, an example personal computer 144, and an example tablet computer 148 that can each include an exemplary touch screen 124-128 according to examples of the disclosure.

Figure 1A:
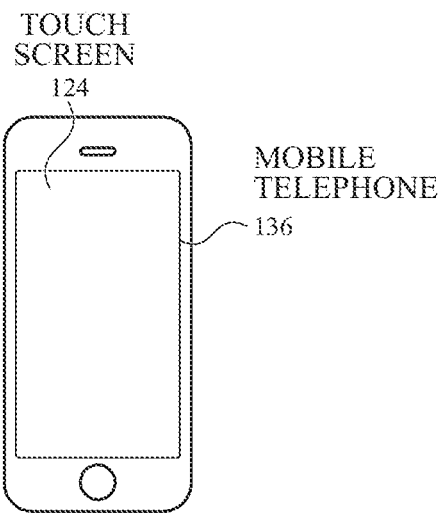
FIGS. 1A-1D illustrate an example mobile telephone, an example media player, an example personal computer, and an example tablet computer that can each include an exemplary touch screen according to examples of the disclosure.
Figure 1B:
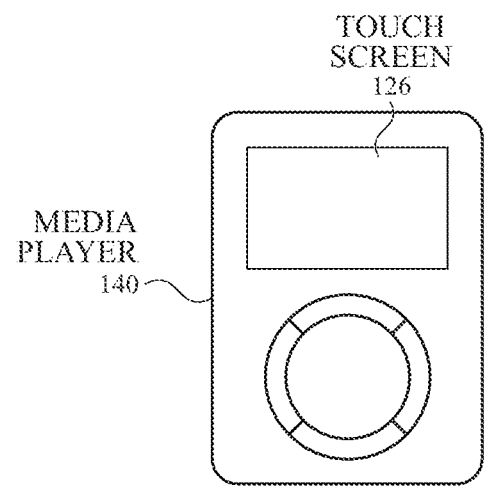
Figure 1C:
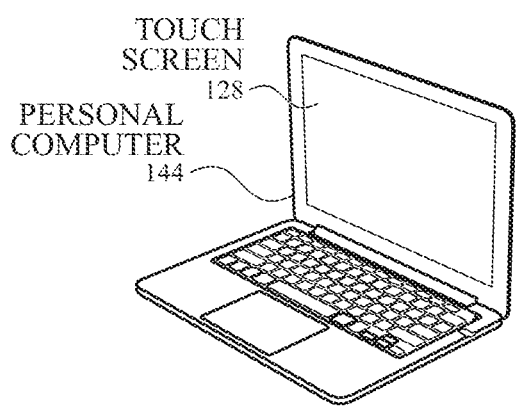
Figure 1D:
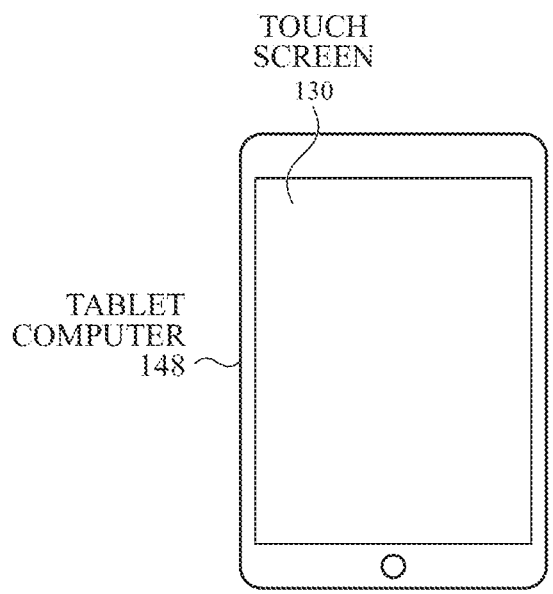

FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2 and with reference to touch screen 502 in FIG. 5). For example, a touch screen can include a plurality of individual touch node electrodes, each touch node electrode identifying or representing a unique location (e.g., a touch node) on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material (as described below with reference to touch screen 400 in FIG. 4), and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include electrodes arranged as drive and sense lines that may cross over each other on different layers, or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

In some examples, touch screens 124, 126, 128 and 130 can be based on mutual capacitance and/or self-capacitance. The electrodes can be arrange as a matrix of small, individual plates of conductive material (e.g., as in touch screen 502 in FIG. 5) or as drive lines and sense lines (e.g., as in touch screen 502 in FIG. 5), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
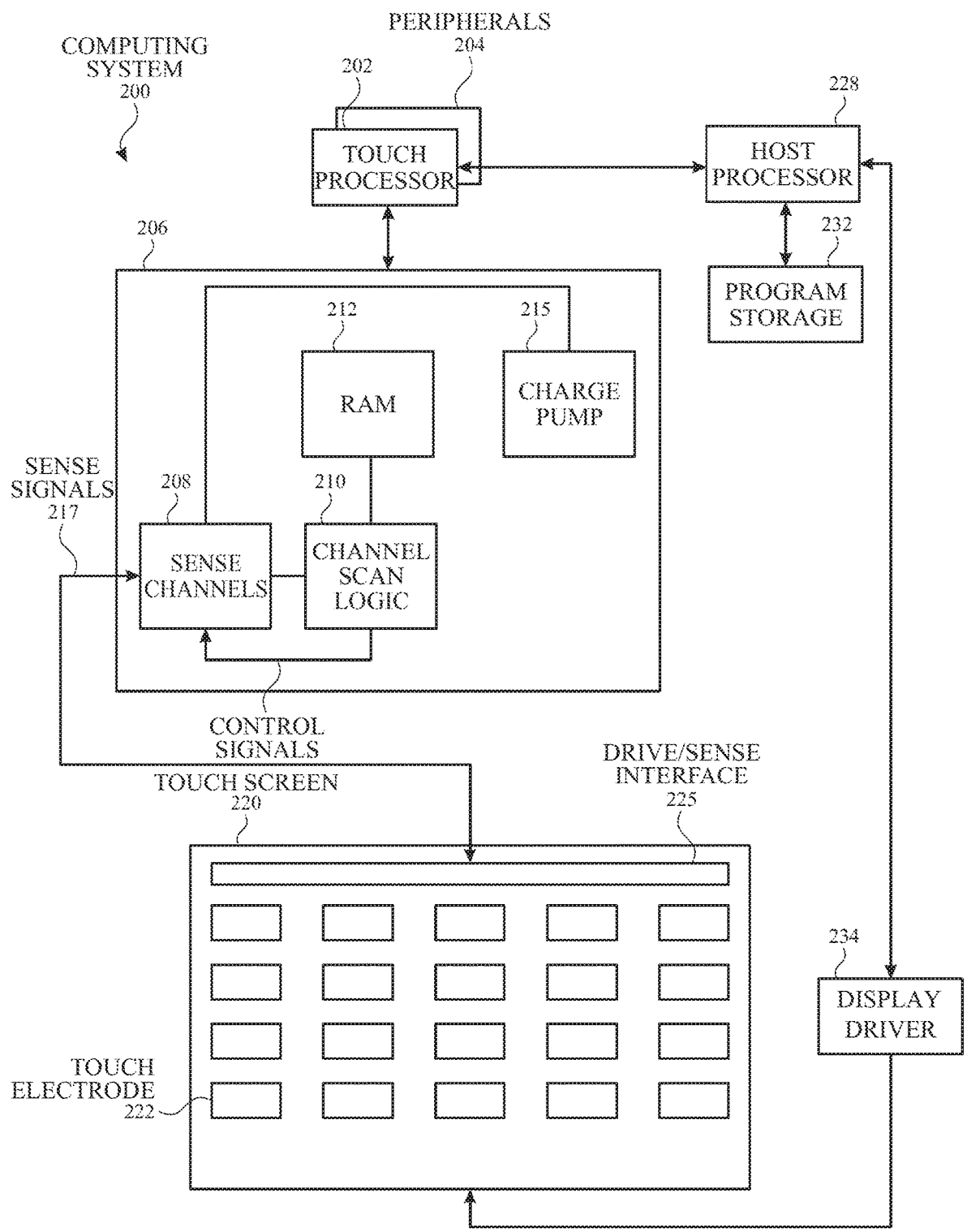
FIG. 2 illustrates a block diagram of an example computing system that illustrates one implementation of an example self-capacitance touch screen according to examples of the disclosure.

FIG. 2 illustrates a block diagram of an example computing system 200 that illustrates one implementation of an example self-capacitance touch screen 220 according to examples of the disclosure. It is understood that computing system 200 can include a mutual capacitance touch screen, as described above, though the examples of the disclosure will be described in the context of a self-capacitance touch screen. Computing system 200 can be included in, for example, mobile telephone 136, digital media player 140, personal computer 144, tablet computer 148, or any mobile or non-mobile computing device that includes a touch screen such as a wearable device. Computing system 200 can include a touch screen including one or more touch processors 202, peripherals 204, a touch controller 206, and touch sensing circuitry (described in more detail below). Peripherals 204 can include, but are not limited to, random access memory (RAM) or other types of memory or storage, watchdog timers, and the like. Touch controller 206 can include, but is not limited to, one or more sense channels 208 and channel scan logic 210. Channel scan logic 210 can access RAM 212, autonomously read data from sense channels 208, and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202, and peripherals 204 can be integrated into a single application specific integrated circuit (ASIC), and in some examples, can be integrated within touch screen 220 itself.

Touch screen 220 can be used to derive touch information at multiple discrete locations of the touch screen, referred to herein as touch nodes. For example, touch screen 220 can include touch sensing circuitry that can include a capacitive sensing medium having a plurality of electrically isolated touch node electrodes 222 (e.g., a plurality of touch node electrodes of pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. As used herein, an electrical component "coupled to" or "connected to" another electrical component encompasses a direct or indirect connection providing electrical path for communication or operation between the coupled components. Thus, for example, touch node electrodes 222 may be directly connected to sense channels or indirectly connected to sense channels via drive/sense interface 225, but in either case provided an electrical path for driving and/or sensing the touch node electrodes 222. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen). In such examples, each touch node electrode in a pixelated self-capacitance touch screen can be sensed for the corresponding touch node represented in the touch image.

Computing system 200 can also include a host processor 228 for receiving outputs from touch processor 202 and performing actions based on the outputs. For example, host processor 228 can be connected to program storage 232 and a display controller, such as an LCD driver 234 (or an LED display or OLED display driver). The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
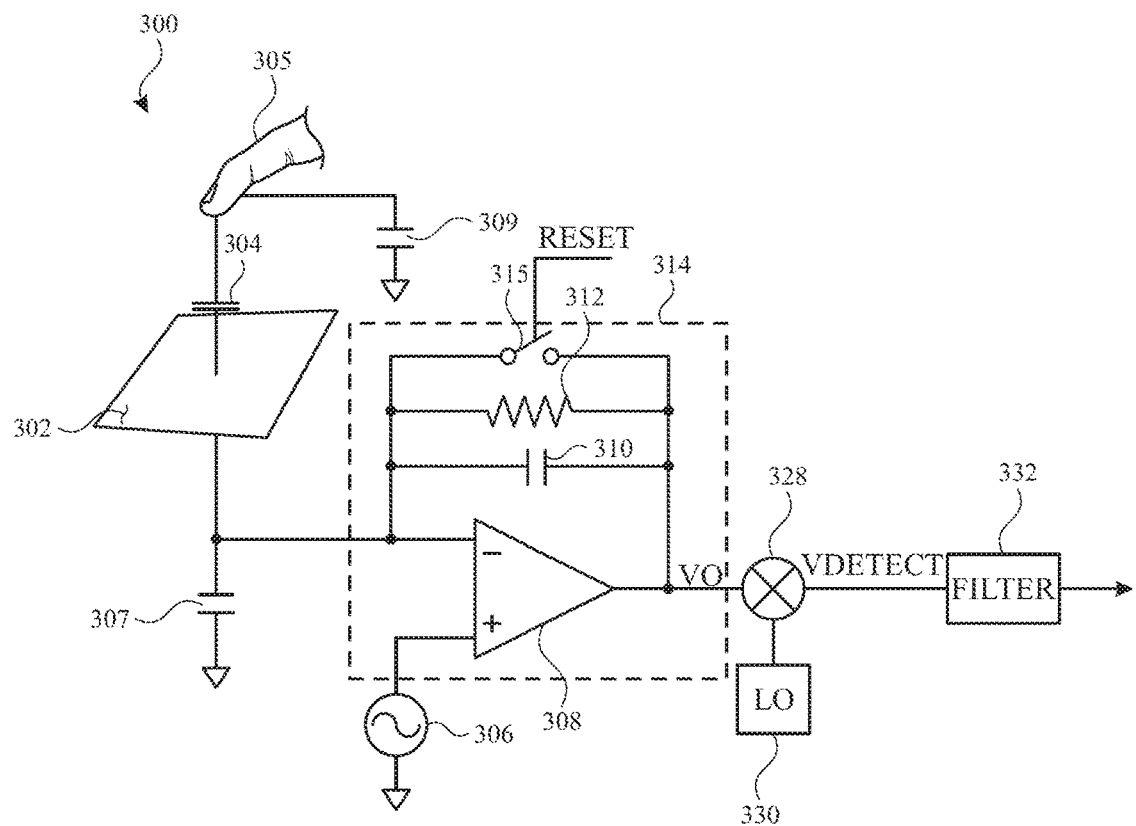
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
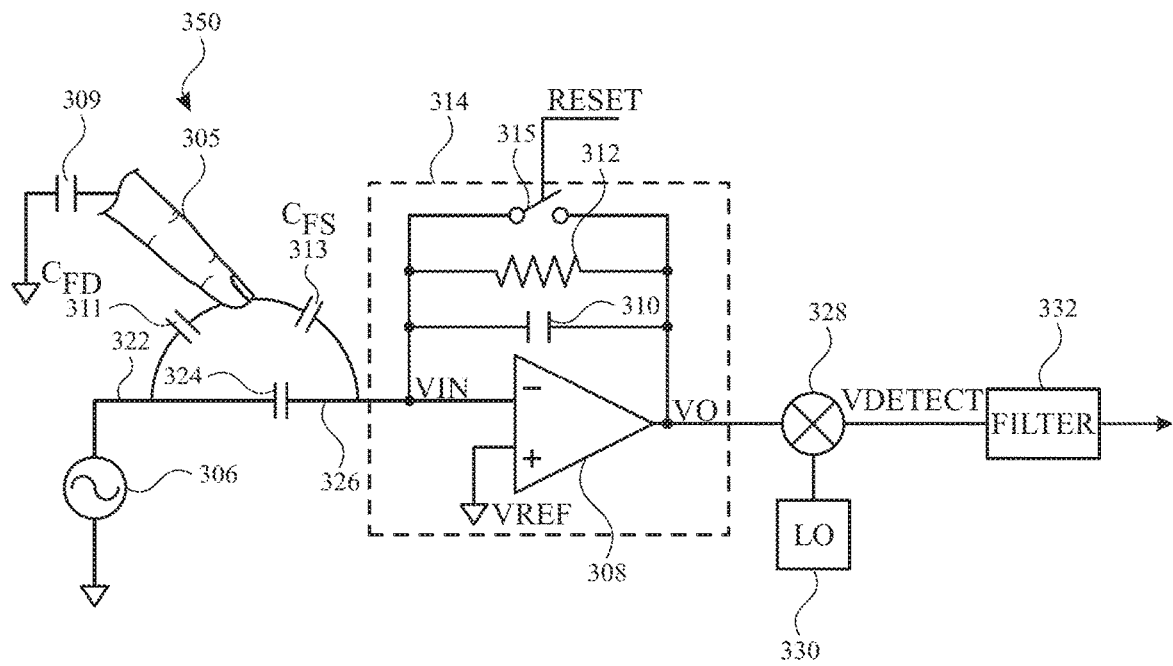
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_1$ substantially equal to $V_{ref}$, and can therefore maintain $V_1$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4:
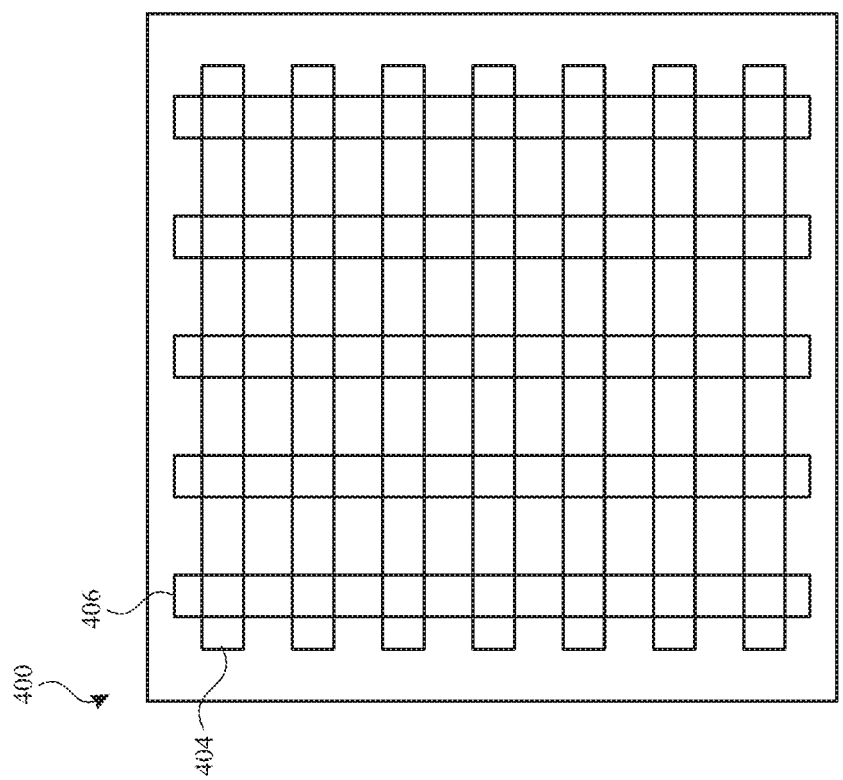
FIG. 4 illustrates a top view of an exemplary touch screen including touch electrodes arranged in rows and columns according to examples of the disclosure.

FIG. 4 illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

Figure 5:
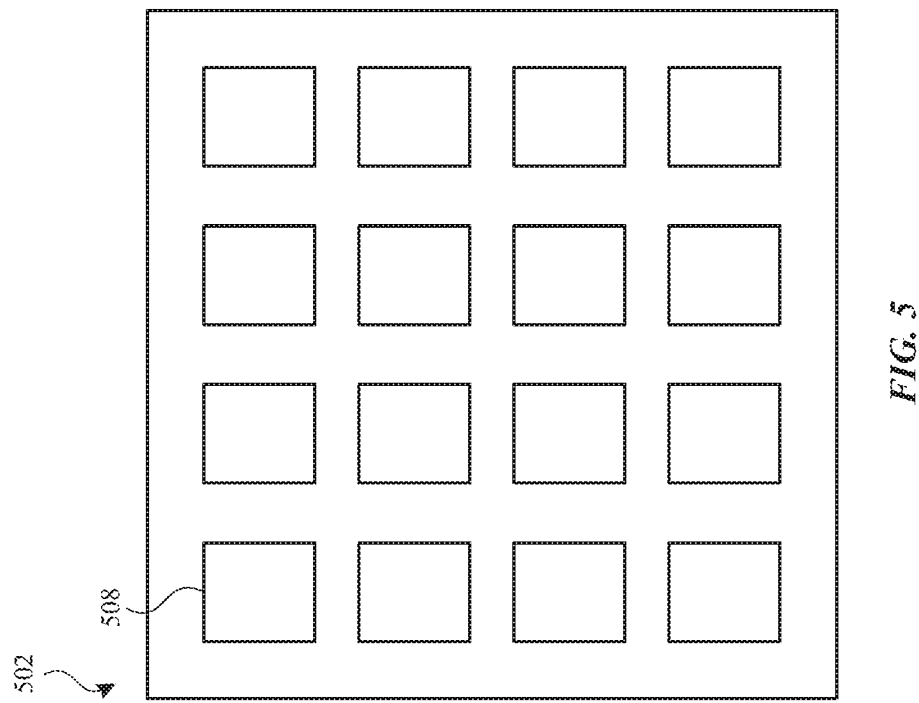
FIG. 5 illustrates touch screen with touch node electrodes arranged in a pixelated touch node electrode configuration according to examples of the disclosure.

FIG. 5 illustrates touch screen 502 with touch node electrodes 508 arranged in a pixelated touch node electrode configuration according to examples of the disclosure. Specifically, touch screen 502 can include a plurality of individual touch node electrodes 508, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 508 can be on the same or different material layers on touch screen 502. In some examples, touch screen 502 can sense the self-capacitance of touch node electrodes 508 to detect touch and/or proximity activity on touch screen 502, and in some examples, touch screen 502 can sense the mutual capacitance between touch node electrodes 508 to detect touch and/or proximity activity on touch screen 502.

In some examples, one or more electrodes (e.g., electrodes 404, 406, or 508) included in a touch screen (e.g., touch screen 400 or touch screen 502) can be formed using techniques and/or materials based on percent light transmission and/or sheet resistance. As will be discussed in more detail below, the inclusion of a thin layer of silver in a transparent conductor stack-up can provide a low sheet resistance (e.g., around 10-20 or 12 ohm/sq) while still allowing for a high percentage (e.g., around 85%-95%, over 90%, over 94%, or 94%) of light transmission in the visible light spectrum.

Figure 6A:
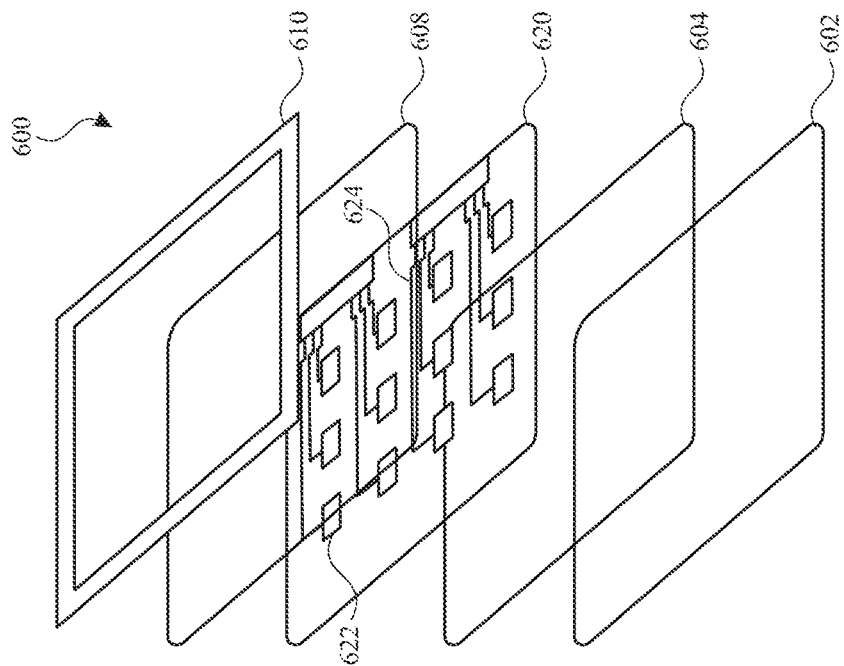
FIGS. 6A-6B illustrate exploded views of an exemplary touch screen according to examples of the disclosure.
Figure 6B:
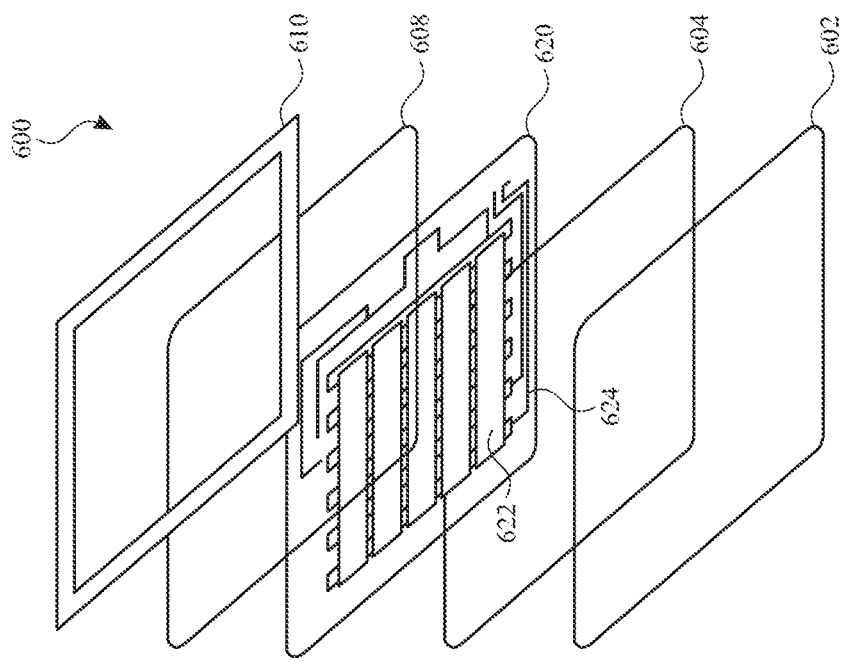

FIG. 6A illustrates an exploded view of an exemplary touch screen 600 according to examples of the disclosure. In some examples, touch screen 600 can include display circuitry 602, touch circuitry 620, and a cover material 610 (e.g., a cover glass). Display circuitry 602 and touch circuitry 620 can be joined together by a first optically clear adhesive 604, for example. In some examples, display circuitry 602 and cover material 610 can be joined together by a second optically clear adhesive 608. Display circuitry 620 can include a plurality of touch electrodes 622 (e.g., touch electrodes 404, 406, or 408) and a plurality of first low-resistance conductors 624 (e.g., routing traces), for example. In the example of FIG. 6A, the touch electrodes are illustrated in an arrangement of rows and columns. In some examples, touch circuitry 620 can be formed to exhibit characteristics in region 518 or 520 of graph 500 (i.e., with high percent light transmission and low sheet resistance). In this way, an image displayed by display circuitry 602 can be visible through touch circuitry 620 and touch circuitry can exhibit good electrical performance. As described above, a shielding layer (e.g., bottom shielding) may be disposed between the display circuitry 602 and touch circuitry 620 to prevent interference between the display and the touch circuitry. FIG. 6B illustrates an exploded view of the exemplary touch screen 600 having touch electrodes 622 arranged in a pixelated configuration. Accordingly, it should be understood that the physical arrangement of touch electrodes can be varied without departing from the scope of the present disclosure.

FIG. 6B illustrates an exploded view of the exemplary touch screen 600 having touch electrodes 622 arranged in a pixelated configuration. Accordingly, it should be understood that the physical arrangement of touch electrodes can be varied without departing from the scope of the present disclosure.

Figure 6C:
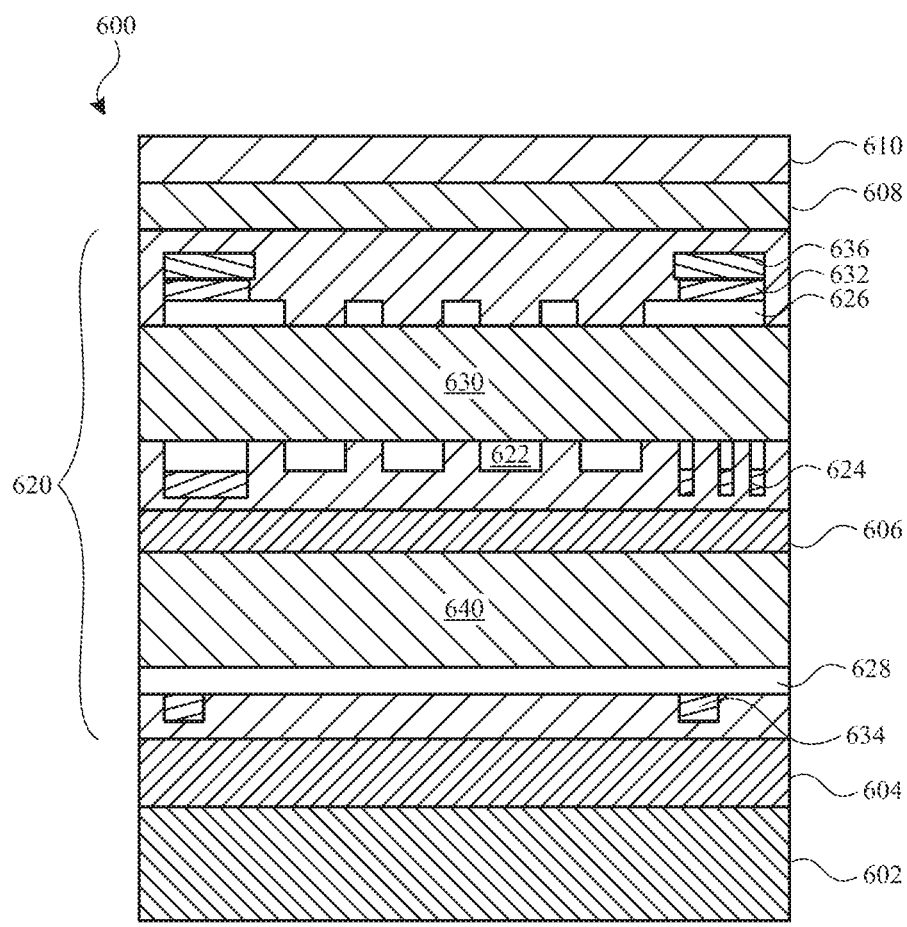
FIG. 6C illustrates an exemplary stackup of a touch screen according to examples of the disclosure.

FIG. 6C illustrates an exemplary stackup of a touch screen 600 according to examples of the disclosure. In particular, FIG. 6C corresponds to the pixelated touch electrode 622 configuration illustrated in FIG. 6B, but it should be understood that a corresponding stackup using the electrode configuration illustrated in FIG. 6A can be used without departing from the scope of the present disclosure. In some examples, touch screen 600 can include touch electrodes 622, first low-resistance conductors 624 (e.g., routing traces), first shielding 626, and second shielding 628. First shielding 626 can be electrically coupled to circuitry (not shown) by second low-resistance conductors 632 (e.g., vias), for example. In some examples, second shielding 628 can be coupled to circuitry (not shown) by second low resistance conductors 634 (e.g., vias). Second low-resistance conductors 632 and 634 (e.g., vias) can be disposed in an outer region (e.g., a border region) around an inner region (e.g., a display region) of the touch screen 600, for example. In some examples, touch screen 600 can further include opaque mask 636 (e.g., black mask), which can be located on top of low-resistance conductors 632, 624, and 634 to fully or partially conceal the vias from a user's view when the device is assembled.

In some examples, touch circuitry 620 can include a first substrate 630 and a second substrate 640. Touch electrodes 622 and first shielding 626 can be formed on first substrate 630 such that first substrate 630 is a two-layer structure, for example. In some examples, touch electrodes 622 and first shielding 626 can include ITO and first substrate 630 can be a DITO (double ITO) substrate. Second shielding 628 can be formed on second substrate 640, for example. In some examples, second shielding 628 can include ITO and second substrate 640 can be a SITO (single ITO) substrate. In some examples, touch screen 600 can further include a third adhesive 606 joining together the elements formed on first substrate 630 and the elements formed on second substrate 640. In some examples, substrates 630 and 640 can each be a transparent insulating material layer that provides structural support to one or more material layers placed on the substrate (e.g., one or more other layers or components). Further, in some examples, each substrate 630 and 640 can include one or more substrates joined together by one or more adhesives (not shown). In some examples, additional or alternative structures and/or layers can be included in touch screen 600 without departing from the scope of the present disclosure. For example, one or more conductive layers can serve an additional or alternative purpose to those discussed with reference to FIGS. 6A-6C.

Figure 7A:
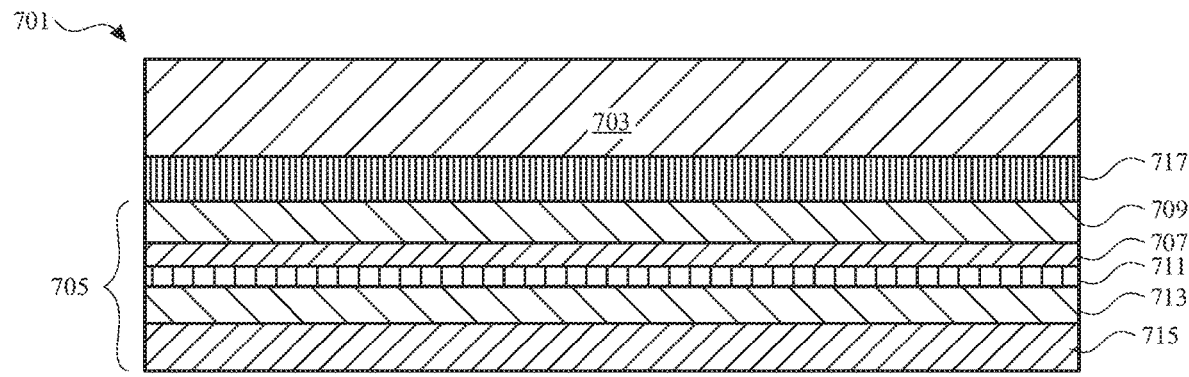
FIGS. 7A-D illustrate exemplary electrode stackups according to examples of the disclosure.

FIG. 7A illustrates an exemplary electrode stackup 701 according to examples of the disclosure. Electrode stackup 701 can include substrate 703 (e.g., substrate 630 or 640 illustrated in FIGS. 6A-6B) and electrode 705, for example. In some examples (e.g., a plastic substrate) the substrate 703 material surface may not adhere well to the electrode 705 material due to material characteristics of the substrate. Electrode 705 can be used to form touch electrodes 622, first shielding 626, or second shielding 628 disclosed above with reference to FIGS. 6A-6B, for example. In some examples, stackup 701 can include one or more additional layers. The additional layers can provide mechanical support and/or structure, adhere other layers together, or improve the optical characteristics of stackup 701, for example. In some examples, layers with other functions are possible.

In some examples, electrode 705 can include a silver layer 707. Silver layer 707 can include pure silver or a silver alloy including a dopant such as bismuth, copper, platinum, and/or nickel in concentrations of 1%-2% or 1%-10%, for example. In some examples, the type and concentration of dopant can depend on the materials used in other layers of the stackup 701 and the processing techniques used to deposit one or more layers of the stackup. For example, the type and concentration of dopant can be selected based on the type of material and type of deposition technique used to form oxide layers 709 and 711 closest to the silver layer 709. In some examples, silver layer 707 can be formed of multiple layers of silver alloy and pure silver where one or more layers include different materials and/or concentrations of dopant. In some examples, the silver alloy can be gradient-doped, meaning the concentrations of dopant vary with respect to position within the silver layer. Silver alloy can be more resistant to oxidation and corrosion than pure silver, for example. In some examples, the silver layer 707 can have a minimum thickness of at least about 3 nanometers. In some examples, the silver layer 707 can have a minimum thickness of at least about 5 nanometers. In some examples, the silver layer 707 can have a maximum thickness of at most about 20 nanometers. In some examples, the silver layer 707 can have a maximum thickness of at most about 12 nanometers, for example. In some examples, silver layer 707 can be between 5 nm to 10 nm nanometers thick or about 6 nm thick. The thickness of silver layer 707 can be selected to allow visible light from a display (e.g., display circuitry 602) to be transmitted through the silver layer while also maintaining a suitably low sheet resistance to reliably conduct electrical signals, for example.

In some examples, silver layer 707 can be disposed on a first oxide layer 709, which can act as a seed to manufacture the silver layer. For example, first oxide layer 709 can provide a smooth surface on which to grow the silver layer, which can allow the silver layer to be deposited with a smooth surface and uniform thickness thereby improving the light transmission and haze performance of stackup 701. First oxide layer 709 can include an optically clear oxide material (e.g., Zinc-Tin-oxide (ZnSnO) or Indium-gallium-zinc-oxide (IGZO)), for example. In some examples, when the first oxide layer 709 includes IGZO, the IGZO can be in an amorphous state and stackup 701 can be formed without annealing. In particular, in contrast to an ITO layer, an IGZO layer may not require annealing to reduce one or more of the sheet resistance and contact resistance of the first oxide layer 709, as IGZO with Ag-layer has a low resistance (e.g., around 10-20 or 10-50 ohms per square) even in the amorphous state, for example. Forming stackup 701 without annealing can, for example, avoid degrading substrate 703 during fabrication that can be caused by exposure to excessive heat. In some examples, the first oxide layer 709 can have a thickness of about 20 to 50 nanometers.

In some examples, a second oxide layer 711 can be located on the silver layer 707 on a side opposite from the side where the first oxide layer 709 is located. The second oxide layer 711 can include a same material (e.g., ZnSnO or IGZO) or a different material (e.g., ZnO, ZnSnO, or IGZO) from the material included in the first oxide layer 709. In some examples, the second oxide layer 711 can include a material that can be placed without the presence of oxygen deposition to reduce oxidation of the silver layer 707 while the second oxide layer is formed. As an example, the second oxide layer 711 can have a thickness of at least about 2 nanometers. In some examples, the second oxide layer 711 can have a thickness of about 1-4 nanometers. A third oxide layer 713 can be located on the second oxide layer 711, for example. In some examples, the third oxide layer 713 can include a clear material, which can be the same material (e.g., ZnSnO or IGZO) included in the first oxide layer 709 or a different oxide material. As discussed above with respect to first oxide layer 709, when the second oxide layer 711 and/or the third oxide layer 713 include IGZO, the IGZO can be in the amorphous state and stackup 701 can be formed without annealing. The third oxide layer 713 can have a thickness of about 10-40 nanometers, for example.

An optical layer 715 with optical properties complementing the optical properties of one or more of the first oxide layer 709, silver layer 707, second oxide layer 711, and third oxide layer 713 can be located on the third oxide layer 711, for example. In some examples, the optical layer 715 can be "index-matched to" (e.g., having a refractive index and/or a reflective index complementary of) one or more of the remaining layers of electrode 705. Optical layer 715 can include a fully or partially transparent material (e.g., $SiO_2$). In some examples, optical layer 715 can have a thickness on the order of 20-150 nanometers.

In some examples, the combination of layers included in electrode 705 can yield an electrode having a high (e.g., around 85%-95%, over 90%, over 94%, or 94%) light transmission and relatively low (e.g., around 10-20 or 12 ohm/sq) sheet resistance. In particular, the sheet resistance of the combination of layers included in electrode 705 can be less than 20 ohms per square, and preferably less than about 12 ohms per square. When used as a shielding layer, the relatively low sheet resistance provided by the electrode 705 can be used as second shielding (e.g., second shielding 628) between touch circuitry and display circuitry of an electronic device, for example. Referring back to FIG. 6B, a shielding signal can be electrically coupled to the electrode 705 for providing the shielding signal to the second shielding layer. The second low-resistance conductors 634 (e.g., vias) can be included only in a perimeter region of the touch screen and can be formed from a non-transparent conductor with a low resistance. The opaque layer 636 can block visibility of the second low-resistance conductors 634 (e.g., vias). The second low-resistance conductors 634 (e.g., vias) can electrically connect to one of the layers of the layer stackup shown in FIG. 7A, e.g., layer 713. In the event that layer 715 is an insulating layer (e.g., $SiO_2$), the layer 715 can be excluded in the perimeter region behind the opaque layer or have holes cut through to allow for contact between layer 713 and the second low-resistance conductors 634 (e.g., vias). The resistance through the thickness of layer 713 in series with the resistance of the second low-resistance conductors 634 (e.g., vias) can be the effective contact resistance for the contact with the silver layer 711. Accordingly, even when the sheet resistance of layer 711 is made very low, a high contact resistance may counteract the benefits of the low sheet resistance of layer 711. Further, in some examples, stackup 701 can be flexible, allowing it to be included in a foldable device with reduced risk of cracking.

In some examples, electrode 705 can be patterned to form touch electrodes (e.g., touch electrodes 622) or first shielding (e.g., first shielding 626) between the touch circuitry and a cover material of an electronic device. Although electrode 705 is illustrated as being located on substrate 703 without electrodes on the other side of the substrate, in some examples, substrate 703 can support electrodes on two of its sides. In some examples, substrate 703 can be a transparent insulating material layer that provides structural support to one or more material layers placed on the substrate (e.g., one or more other layers or components). Further, in some examples, substrate 703 can include one or more substrates joined together by one or more adhesives (not shown).

Figure 7B:
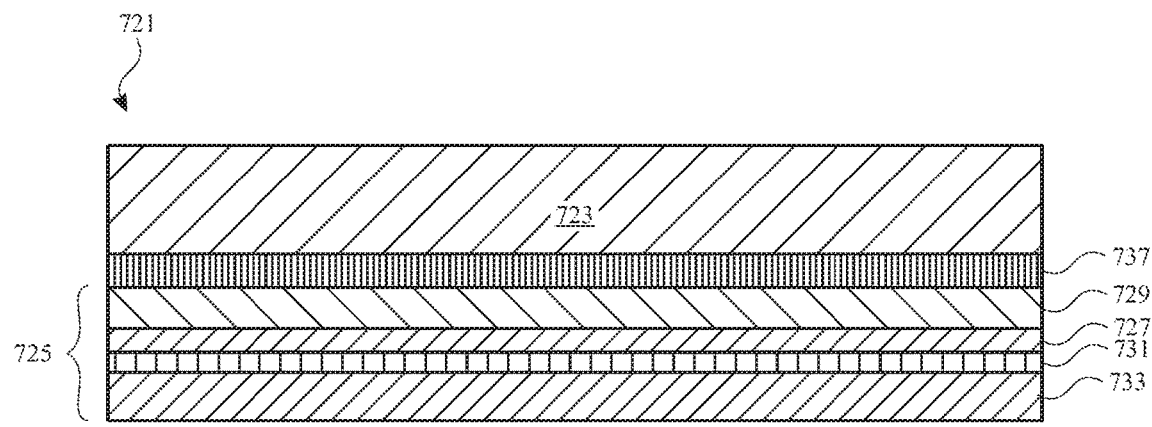

FIG. 7B illustrates an exemplary electrode stackup 721 according to examples of the disclosure. Electrode stackup 721 can include substrate 723 (e.g., substrate 630 or 640 illustrated in FIGS. 6A-6B) and electrode 725, for example. In some examples (e.g., a plastic substrate) the substrate 723 material surface may not adhere well to the electrode 725 material due to material characteristics of the substrate. Electrode 725 can be used to form touch electrodes 622, first shielding 626, or second shielding 628 disclosed above with reference to FIGS. 6A-6B. In some examples, stackup 721 can include one or more additional layers. The additional layers can provide mechanical support and/or structure, adhere other layers together, or improve the optical characteristics of stackup 721, for example. In some examples, layers with other functions are possible.

In some examples, electrode 725 can include a silver layer 727. Silver layer 727 can include pure silver or a silver alloy including a dopant such as bismuth, platinum, and/or nickel in concentrations of 1%-2% or 1%-10%, for example. In some examples, the type and concentration of dopant can depend on the materials used in other layers of the stackup 721 and the processing techniques used to deposit one or more layers of the stackup. For example, the type and concentration of dopant can be selected based on the type of material and type of deposition technique used to form the oxide layers 729 and 731 closest to the silver layer 729. In some examples, silver layer 727 can be formed of multiple layers of silver alloy and pure silver where one or more layers include different materials and/or concentrations of dopant. In some examples, the silver alloy can be gradient-doped, meaning the concentrations of dopant vary with respect to position within the silver layer. Silver alloy can be more resistant to oxidation and corrosion than pure silver, for example. The silver layer 727 can have a thickness on the order of 3 to 12 nanometers, for example. In some examples, silver layer 727 can be 5-10 nanometers thick or 6 nm thick. The thickness of silver layer 727 can be selected to allow light from a display (e.g., display circuitry 602) to be transmitted through the silver layer while also maintaining a suitable sheet resistance to reliably conduct electrical signals, for example.

In some examples, silver layer 727 can be located on a first oxide layer 729, which can act as a seed to manufacture the silver layer. For example, first oxide layer 729 can provide a smooth surface on which to grow the silver layer, thereby improving the light transmission and haze performance of stackup 721. First oxide layer 729 can include an optically clear oxide material (e.g., ZnSnO or IGZO), for example. In some examples, when the first oxide layer 729 includes IGZO, the IGZO can be in an amorphous state and stackup 721 can be formed without annealing. In particular, in contrast to an ITO layer, an IGZO layer may not require annealing to reduce one or more of the sheet resistance and the contact resistance of the first oxide layer 729, as electrodes including IGZO can have a low sheet resistance (e.g., around 10-20 or 10-50 ohms per square) even in the amorphous state, for example. Forming stackup 721 without annealing can, for example, avoid degrading substrate 723 during fabrication that can be caused by exposure to excessive heat. In some examples, first oxide layer can have a thickness on the order of 10-50 nanometers.

In some examples, a second oxide layer 721 can be located on the silver layer 727 on a side opposite from the side where the first oxide layer 729 is located. The second oxide layer 731 can include a same material or a different material (e.g., ZnO) from the material included in the first oxide layer 729. In some examples, the second oxide layer 731 can include a material that can be placed without the use of oxygen deposition to reduce oxidation of the silver layer 727 while the second oxide layer is formed. As an example, the second oxide layer 721 can have a thickness on the order of 1-4 nanometers.

A conductive layer 733 can be located on the second oxide layer 731, for example. In some examples, conductive layer 733 can include a fully or partially transparent material (e.g., ITO). The conductive layer 733 can be index-matched to one or more other components of electrode 725 to increase transparency of electrode 725, for example. In some examples, the conductive layer 733 can have a thickness on the order of 10-50 nanometers. As discussed above with respect to first oxide layer 729, when the second oxide layer 731 includes IGZO, the IGZO can be in the amorphous state and stackup 721 can be formed without annealing.

In some examples, the combination of layers included in electrode 725 can yield an electrode having a relatively high (e.g., around 85%-95%, over 90%, over 94%, or 94%) percent light transmission and relatively low (e.g., around 10-20 or 12 ohm/sq) sheet resistance. In particular, the sheet resistance of the combination of layers included in electrode 725 can be less than 20 ohms per square, and preferably less than 12 ohms per square. Electrode 725 can be used as second shielding (e.g., second shielding 628) between touch circuitry and display circuitry of an electronic device, for example. Referring back to FIG. 6B, a shielding signal can be electrically coupled to the electrode 705 for providing the shielding signal to the second shielding layer. The second low-resistance conductors 634 (e.g., vias) can be included only in a perimeter region of the touch screen and can be formed from a non-transparent conductor with a low resistance. The opaque layer 636 can block visibility of the second low-resistance conductors 634 (e.g., vias). The second low-resistance conductors 634 (e.g., vias) can electrically connect to one of the layers of the layer stackup shown in FIG. 7A, e.g., layer 733. The resistance through the thickness of layer 733 in series with the resistance of the second low-resistance conductors 634 (e.g., vias) can be the effective contact resistance for the contact with the silver layer 711. Accordingly, even when the sheet resistance of layer 731 is made very low, a high contact resistance may counteract the benefits of the low sheet resistance of layer 731. Accordingly, in some examples, ITO can provide a suitable contact resistance while also maintaining desired transmission characteristics of visible light.

In some examples, electrode 725 can be patterned to form touch electrodes (e.g., touch electrodes 622) or first shielding (e.g., first shielding 626) between the touch circuitry and a cover material of an electronic device. Although electrode 725 is illustrated as being located on substrate 723 without electrodes on the other side of the substrate, in some examples, substrate 723 can support electrodes on two of its sides. In some examples, substrate 723 can each be a transparent insulating material layer that provides structural support to one or more material layers placed on the substrate (e.g., one or more other layers or components). Further, in some examples, substrate 723 can include one or more substrates joined together by one or more adhesives (not shown). Further, in some examples, stackup 721 can be flexible, allowing it to be included in a foldable device with reduced risk of cracking.

In some examples, electrode stackup 701 and electrode stackup 721 can have different performance characteristics. For example, electrode stackup 701 can have improved optical transmission compared to electrode stackup 721 because third oxide layer 713 and optical layer 715 can have a higher percent visible light transmission than ITO layer 733. In some examples, electrode stackup 721 can have improved electrical conductivity compared to electrode stackup 701 because ITO layer 733 can have improved electrical conductivity (i.e., lower sheet resistance) compared to third oxide layer 713 and optical layer 715. In some examples, other tradeoffs and design considerations are possible. Further, additional factors such as the thickness of one or more material layers can impact the sheet resistance and/or percent light transmission of electrode stackup 701 or electrode stackup 721.

Figure 7C:
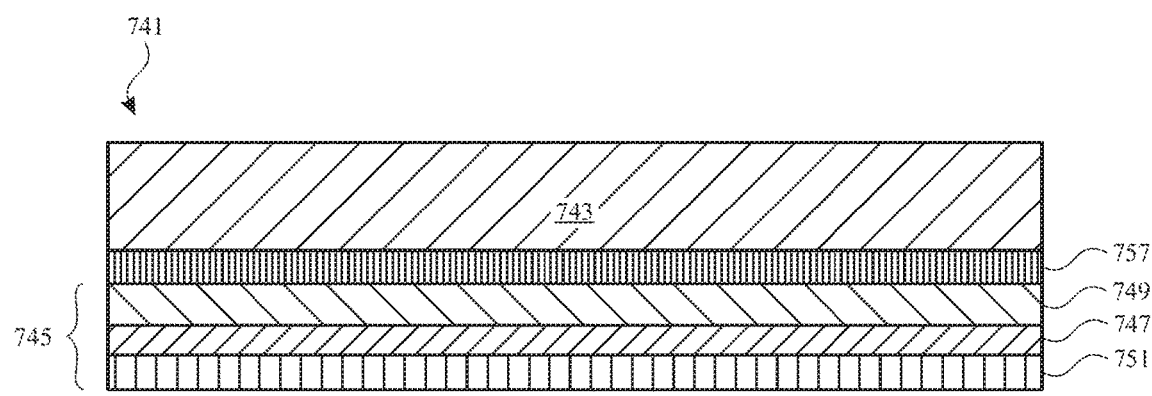

FIG. 7C illustrates an exemplary electrode stackup 741 according to examples of the disclosure. Electrode stackup 741 can include substrate 743 (e.g., substrate 630 or 640 illustrated in FIGS. 6A-6B) and electrode 745, for example. In some examples (e.g., a plastic substrate) the substrate 743 material surface may not adhere well to the electrode 745 material due to material surface characteristics of the substrate. Electrode 745 can be used to form touch electrodes 622, first shielding 626, or second shielding 628 disclosed above with reference to FIGS. 6A-6B. In some examples, stackup 741 can include one or more additional layers. The additional layers can provide mechanical support and/or structure, adhere other layers together, or improve the optical characteristics of stackup 741, for example. In some examples, layers with other functions are possible.

In some examples, electrode 745 can include a silver layer 747. Silver layer 747 can include pure silver or a silver alloy including a dopant such as bismuth, copper, platinum, and/or nickel in concentrations of 1%-2% or 1%-10%, for example. In some examples, the type and concentration of dopant can depend on the materials used in other layers of the stackup 741 and the processing techniques used to deposit one or more layers of the stackup. For example, the type and concentration of dopant can be selected based on the type of material and type of deposition technique used to form the oxide layers 749 and 751 closest to the silver layer 749. In some examples, silver layer 747 can be formed of multiple layers of silver alloy and pure silver where one or more layers include different materials and/or concentrations of dopant. In some examples, the silver alloy can be gradient-doped, meaning the concentrations of dopant vary with respect to position within the silver layer. Silver alloy can be more resistant to oxidation and corrosion than pure silver, for example. The silver layer 747 can have a thickness on the order of 3 to 12 nanometers, for example. In some examples, silver layer 747 can be 5-10 nanometers thick or 6 nm thick. The thickness of silver layer 747 can be selected to allow light from a display (e.g., display circuitry 602) to be transmitted through the silver layer while also maintaining a suitable sheet resistance to reliably conduct electrical signals, for example.

In some examples, silver layer 747 can be located on a first oxide layer 749, which can act as a seed to manufacture the silver layer. For example, first oxide layer 749 can provide a smooth surface on which to grow the silver layer, thereby improving the light transmission and haze performance of stackup 741. First oxide layer 749 can include an optically clear oxide material (e.g., ZnSnO or IGZO), for example. In some examples, when the first oxide layer 749 includes IGZO, the IGZO can be in an amorphous state and stackup 741 can be formed without annealing. In particular, in contrast to an ITO layer, an IGZO layer may not require annealing to reduce one or more of the sheet resistance and contact resistance of the first oxide layer 749, as IGZO with Ag-stack has a low resistance (e.g., around 10-20 or 10-50 ohms per square) even in the amorphous state, for example. Forming stackup 701 without annealing can, for example, avoid degrading substrate 743 during fabrication that can be caused by exposure to excessive heat. In some examples, first oxide layer 749 can have a thickness on the order of 10-50 nanometers.

In some examples, a second oxide layer 751 can be located on the silver layer 747 on a side opposite from the side where the first oxide layer 749 is located. The second oxide layer 751 can include a same material (e.g., ZnSnO or IGZO) or a different material (e.g., ZnO, ZnSnO, or IGZO) from the material included in the first oxide layer 749. In some examples, the second oxide layer 751 can include a material that can be placed without the use of oxygen deposition to reduce oxidation of the silver layer 747 while the second oxide layer is formed. As discussed above with respect to first oxide layer 749, when the second oxide layer 751 includes IGZO, the IGZO can be in the amorphous state and stackup 741 can be formed without annealing. As an example, the second oxide layer 751 can have a thickness on the order of 1-4 nanometers.

In some examples, the combination of layers included in electrode 745 can yield an electrode having a relatively high (e.g., around 85%-95%, over 90%, over 94%, or 94%) percent light transmission and relatively low (e.g., around 10-20 or 12 ohm/sq) sheet resistance. In particular, the sheet resistance of the combination of layers included in electrode 745 can be less than 20 ohms per square, and preferably less than 12 ohms per square. Electrode 745 can be used as second shielding (e.g., second shielding 628) between touch circuitry and display circuitry of an electronic device, for example. Referring back to FIG. 6B, a shielding signal can be electrically coupled to the electrode 745 for providing the shielding signal to the second shielding layer. The second low-resistance conductors 634 (e.g., vias) can be included only in a perimeter region of the touch screen and can be formed from a non-transparent conductor with a low resistance. The opaque layer 636 can block visibility of the second low-resistance conductors 634 (e.g., vias). The second low-resistance conductors 634 (e.g., vias) can electrically connect to one of the layers of the layer stackup shown in FIG. 7C, e.g., layer 751. The resistance through the thickness of layer 751 in series with the resistance of the second low-resistance conductors 634 (e.g., vias) can be the effective contact resistance for the contact with the silver layer 747. Further, in some examples, stackup 741 can be flexible, allowing it to be included in a foldable device with reduced risk of cracking.

Figure 7D:
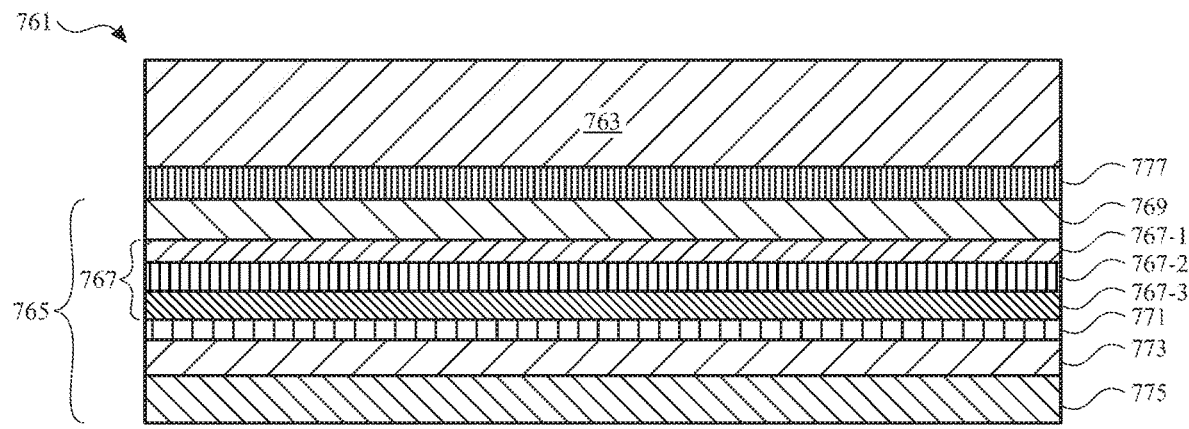

FIG. 7D illustrates an exemplary electrode stackup 761 according to examples of the disclosure. Electrode stackup 761 can include substrate 763 (e.g., substrate 630 or 640 illustrated in FIGS. 6A-6B) and electrode 765, for example. In some examples (e.g., a plastic substrate) the substrate 763 material surface may not adhere well to the electrode 765 material due to material characteristics of the substrate. Electrode 765 can be used to form touch electrodes 622, first shielding 626, or second shielding 628 disclosed above with reference to FIGS. 6A-6B. In some examples, stackup 761 can include one or more additional layers. The additional layers can provide mechanical support and/or structure, adhere other layers together, or improve the optical characteristics of stackup 761, for example. In some examples, layers with other functions are possible.

In some examples, electrode 765 can include a silver layer 767. The silver layer 767 can have a thickness on the order of 3 to 15 nanometers, for example. In some examples, silver layer 747 can be 5-10 nanometers thick or 6 nm thick. Silver layer 767 can be built from multiple distinct layers with varying concentrations of dopant within (or no dopant) in each of the individual silver layers 767-1, 767-2, and 767-3, for example. In some examples, the silver layers 767-1 and 767-3 can have higher concentration of dopant and can thus be more resistant to oxidation than a pure silver. In this way, silver layer 767-2 can be protected by silver layer 767-1 and 767-3, for example. In some examples, silver layer 767-2 can be pure silver or a silver alloy with a lower concentration of dopant than that of silver layers 767-1 and 767-3. In some examples, the three layers 767-1, 767-2, and 767-3 can be deposited as discrete layers. In some examples, the 767-1, 767-2, and 767-3 can actually be formed as a single silver layer that has a doping gradient through its thickness (i.e., the silver layer can be gradient-doped). For simplicity of explanation, the layers 767-1, 767-2, and 767-3 will be described as distinct layers but it should be understood that a single layer (e.g., as described in FIGS. 7A-7C above) having a doping gradient or other variable doping through its thickness can also be used without departing from the scope of the present disclosure. One or more of silver layers 767-1, 767-2, and 767-3 can be doped with one or more of bismuth, platinum, and/or nickel in concentrations of around 1% to 2%, for example. The thickness of silver layer 767 can be selected to allow light from a display (e.g., display circuitry 602) to be transmitted through the silver layer while also maintaining a suitable sheet resistance to reliably conduct electrical signals, for example.

In some examples, silver layer 767 can be located on a first oxide layer 769, which can act as a seed to manufacture the silver layer. For example, first oxide layer 769 can provide a smooth surface on which to grow the silver layer 767, thereby improving the light transmission and haze performance of stackup 761. First oxide layer 769 can include an optically clear oxide material (e.g., ZnSnO or IGZO), for example. In some examples, when the first oxide layer 769 includes IGZO, the IGZO can be in an amorphous state and stackup 761 can be formed without annealing. In particular, in contrast to an ITO layer, an IGZO layer may not require annealing to reduce the contact resistance of the first oxide layer 769, as electrodes including IGZO may have a low resistance (e.g., around 10-20 or 10-50 ohms per square) even in the amorphous state, for example. Forming stackup 761 without annealing can, for example, avoid degrading substrate 763 during fabrication that can be caused by exposure to excessive heat. In some examples, first oxide layer 769 can have a thickness on the order of 10-50 nanometers.

In some examples, a second oxide layer 771 can be located on the silver layer 767 on a side opposite from the side where the first oxide layer 769 is located. The second oxide layer 771 can include a same material (e.g., ZnSnO or IGZO) or a different material (e.g., ZnO, ZnSnO, or IGZO) from the material included in the first oxide layer 769. In some examples, the second oxide layer 771 can include a material that can be placed without the presence of oxygen deposition to reduce oxidation of the silver layer 767 while the second oxide layer is formed. As an example, the second oxide layer 771 can have a thickness of at least about 2 nanometers. In some examples, the second oxide layer 771 can have a thickness of about 1-4 nanometers. A third oxide layer 763 can be located on the second oxide layer 771, for example. In some examples, the third oxide layer 773 can include a clear material, which can be the same material (e.g., ZnSnO or IGZO) included in the first oxide layer 769 or a different oxide material. As discussed above with respect to first oxide layer 769, when the second oxide layer 771 and/or the third oxide layer 773 include IGZO, the IGZO can be in the amorphous state and stackup 761 can be formed without annealing The third oxide layer 773 can have a thickness of about 10-40 nanometers, for example.

An optical layer 775 with optical properties complementing the optical properties of one or more of the first oxide layer 769, silver layer 767, second oxide layer 771, and third oxide layer 773 can be located on the third oxide layer 771, for example. In some examples, the optical layer 775 can be "index-matched to" (e.g., having a refractive index and/or a reflective index complementary of) one or more of the remaining layers of electrode 765. Optical layer 775 can include a fully or partially transparent material (e.g., $SiO_2$). In some examples, optical layer 775 can have a thickness on the order of 20-150 nanometers.

In some examples, the combination of layers included in electrode 765 can yield an electrode having a relatively high (e.g., around 85%-95%, over 90%, over 94%, or 94%) percent light transmission and relatively low (e.g., around 10-20 or 12 ohm/sq) sheet resistance. In particular, the sheet resistance of the combination of layers included in electrode 745 can be less than 20 ohms per square, and preferably less than 12 ohms per square. Electrode 745 can be used as second shielding (e.g., second shielding 628) between touch circuitry and display circuitry of an electronic device, for example. Referring back to FIG. 6B, a shielding signal can be electrically coupled to the electrode 745 for providing the shielding signal to the second shielding layer. The second low-resistance conductors 634 (e.g., vias) can be included only in a perimeter region of the touch screen and can be formed from a non-transparent conductor with a low resistance. The opaque layer 636 can block visibility of the second low-resistance conductors 634 (e.g., vias). The second low-resistance conductors 634 (e.g., vias) can electrically connect to one of the layers of the layer stackup shown in FIG. 7D, e.g., layer 771. The resistance through the thickness of layer 751 in series with the resistance of the second low-resistance conductors 634 (e.g., vias) can be the effective contact resistance for the contact with the silver layer 747. Further, in some examples, stackup 761 can be flexible, allowing it to be included in a foldable device with reduced risk of cracking.

Figure 8:
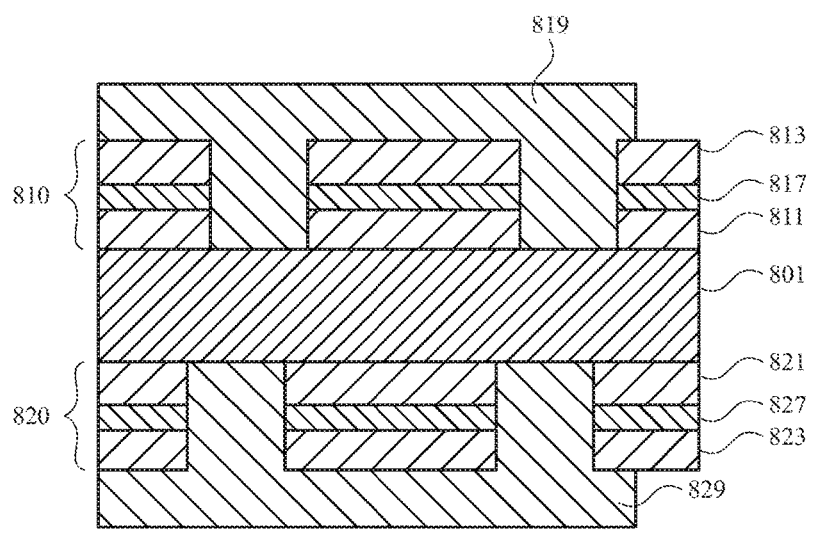
FIG. 8 illustrates an exemplary electrode stackup according to examples of the disclosure.

FIG. 8 illustrates an exemplary electrode stackup 800 according to examples of the disclosure. In some examples, electrode stackup 800 can include a substrate 801, a first electrode layer 810, and a second electrode layer 820. For example, first electrode layer 810 can include a first conductive layer 811, second conductive layer 813, first silver layer 817, and first passivation 819. In some examples, second electrode layer 820 can include third conductive layer 821, fourth conductive layer 823, second silver layer 823, and second passivation 829. For example, conductive layers 811, 813, 821 and 823 can include a conductive material (e.g., ITO or another fully or partially transparent conductive material).

In some examples, first electrode layer 810 can be patterned to create a plurality of electrically isolated electrodes. For example, the electrodes can be electrically isolated by passivation 819, which can include an insulating and/or non-corrosive material. First silver layer 817 can conduct an electrical signal, transmit visible light (e.g., produced by display circuitry disposed beneath electrode stackup 800), and reflect infrared light, for example. In some examples, first silver layer 817 can reflect infrared light emitted by the sun, thereby reducing the amount of solar heating of the electrode stackup 800.

In some examples, second electrode layer 820 can be patterned to create a plurality of electrically isolated electrodes. For example, the electrodes can be electrically isolated by passivation 829, which can include an insulating and/or non-corrosive material. Second silver layer 827 can conduct an electrical signal, transmit visible light (e.g., produced by display circuitry disposed beneath electrode stackup 800), and reflect infrared light, for example. In some examples, second silver layer 827 can reflect infrared light emitted by the sun, thereby reducing the amount of solar heating of the electrode stackup 800.

In some examples, substrate 801 can each be a transparent insulating material layer that provides structural support to one or more material layers placed on the substrate (e.g., one or more other layers or components). Further, in some examples, substrate 801 can include one or more substrates joined together by one or more adhesives (not shown). Substrate 801 can include the first electrode layer 810 and the second electrode layer 820, making substrate 801 a two layer structure, for example. In some examples, electrode layers 810 and 820 can include ITO, making substrate 801 a DITO substrate. Although FIG. 8 illustrates substrate 801 as supporting two layers of electrodes, in some examples, substrate 801 can support a single electrode layer (i.e., substrate 801 can be a one layer structure and/or a SITO substrate). In some examples, electrode stackup 800 can include additional or alternative components not illustrated in FIG. 8. For example, electrode stackup 800 can include oxide layers (e.g., one or more of oxide layers 709, 711, 713, 729, and/or 931) and/or optical layers (e.g., optical layer 715).

Figure 9A:
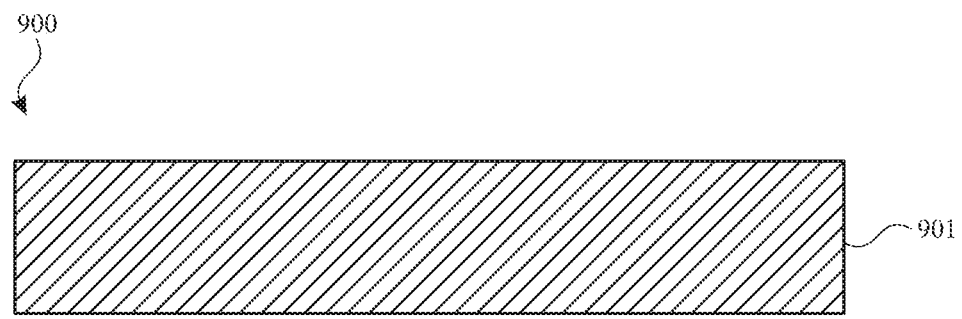
FIGS. 9A-9I illustrate exemplary steps of forming an electrode stackup according to examples of the disclosure.
Figure 9B:
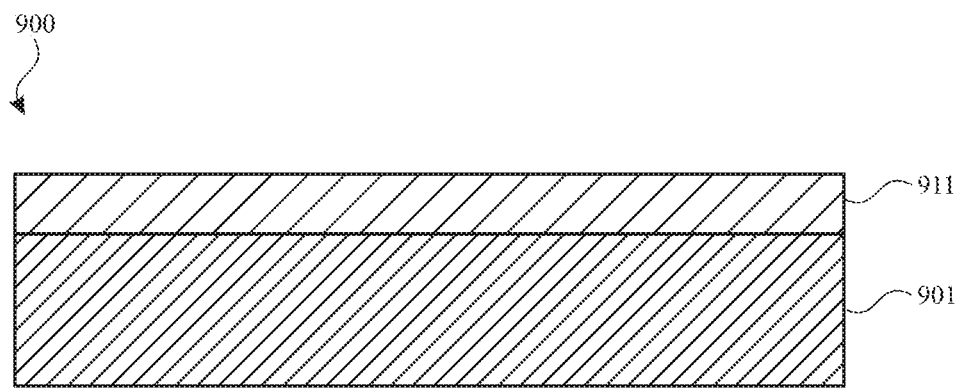
Figure 9C:
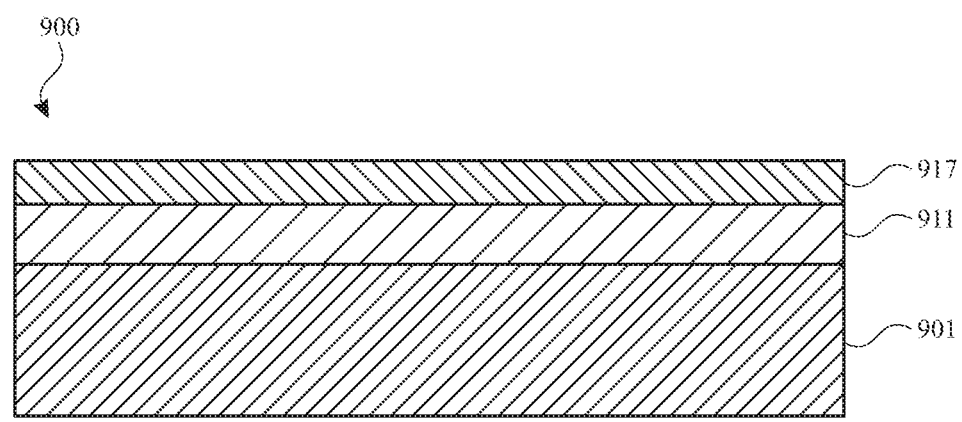
Figure 9D:
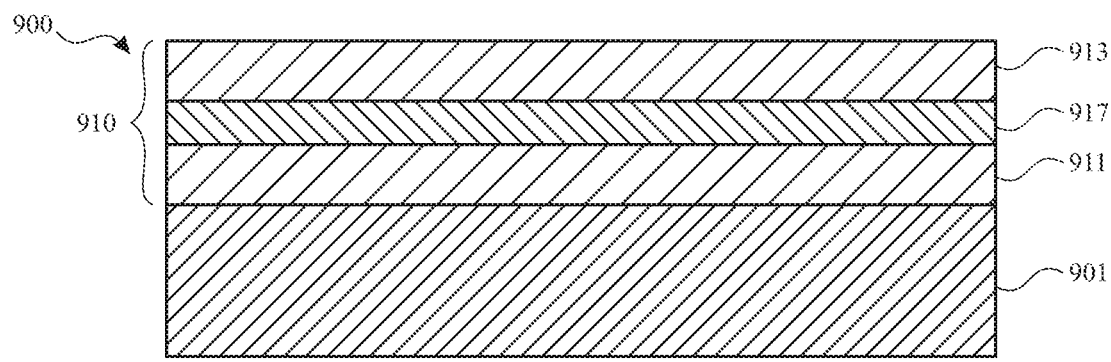

FIGS. 9A-9I illustrate exemplary steps of forming an electrode stackup 900 according to examples of the disclosure. In some examples, the electrode stackup 900 can be formed using a sputtering technique, a roll-to-roll coating method, or any other suitable technique. FIG. 9A illustrates providing an exemplary substrate 901 on which to support additional layers of electrode stackup 900 according to examples of the disclosure. FIG. 9B illustrates forming an exemplary first conductive layer 911 on substrate 901 according to examples of the disclosure. In some examples, first conductive layer 911 can include a conductive material (e.g., ITO or another fully or partially transparent conductive material). FIG. 9C illustrates forming a first silver layer 917 of electrode stackup 900 according to examples of the disclosure. FIG. 9D illustrates forming an exemplary second conductive layer 913 of electrode stackup 900 according to examples of the disclosure. In some examples, second conductive layer 913 can include a conductive material (e.g., ITO or another fully or partially transparent conductive material). First conductive layer 911, second conductive layer 913, and first silver layer 917 can form a first electrode layer 910 of electrode stackup 900, for example.

Figure 9E:
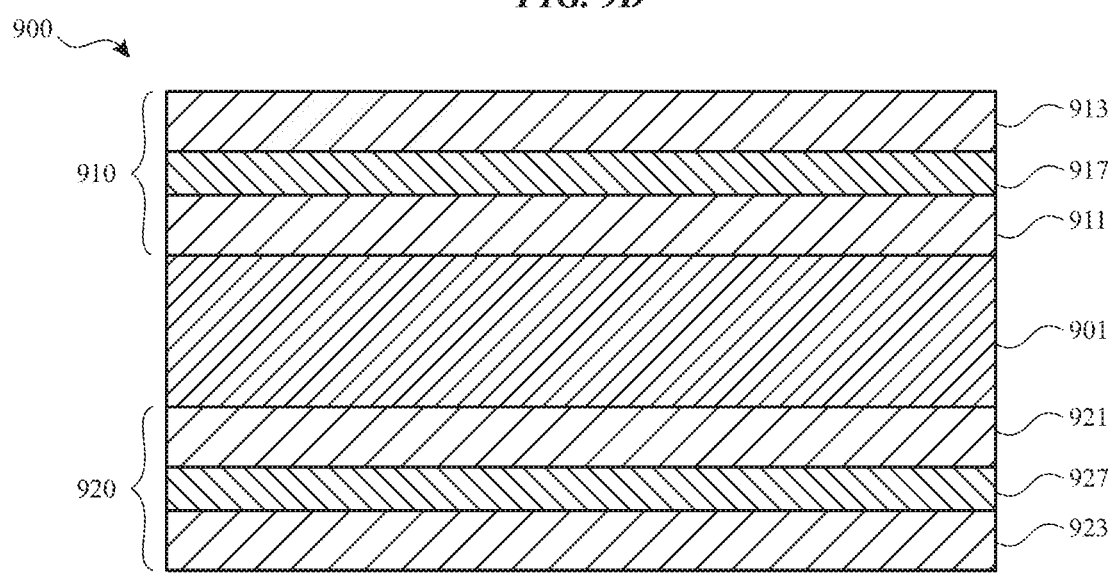
Figure 9F:
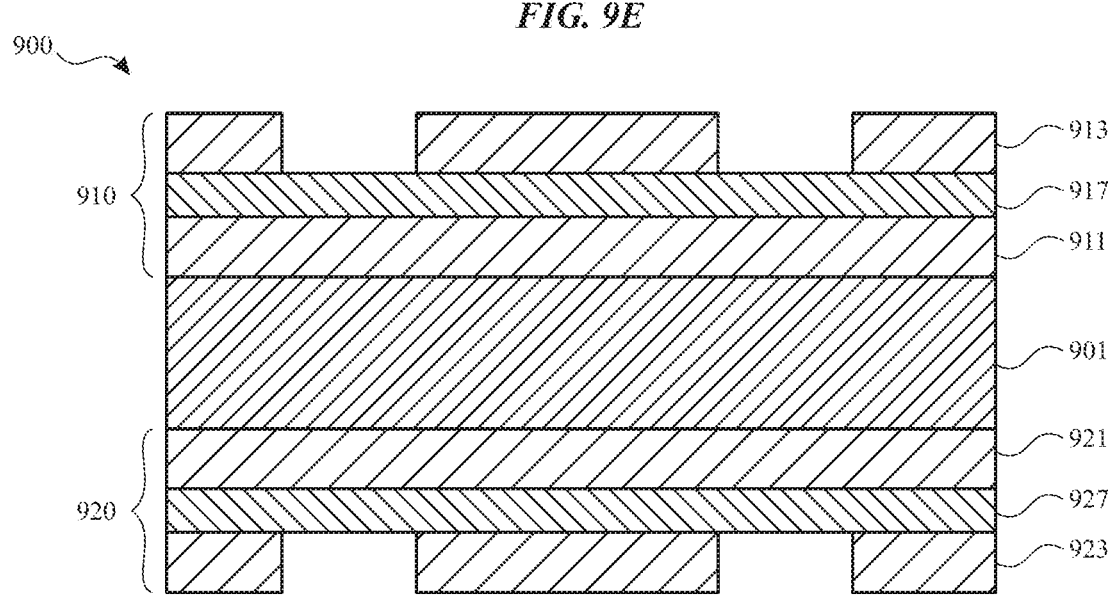
Figure 9G:
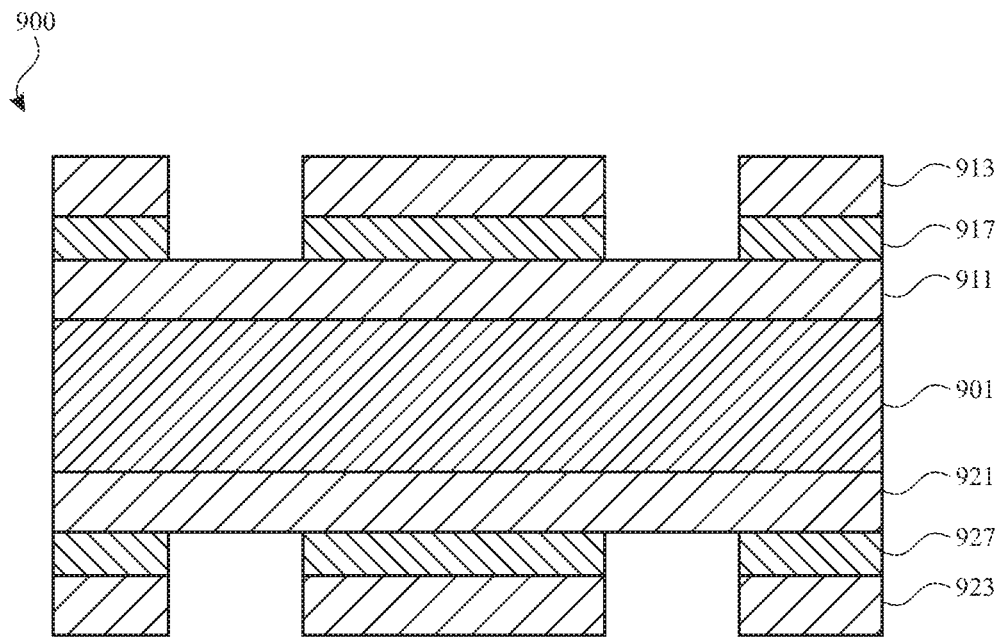
Figure 9H:
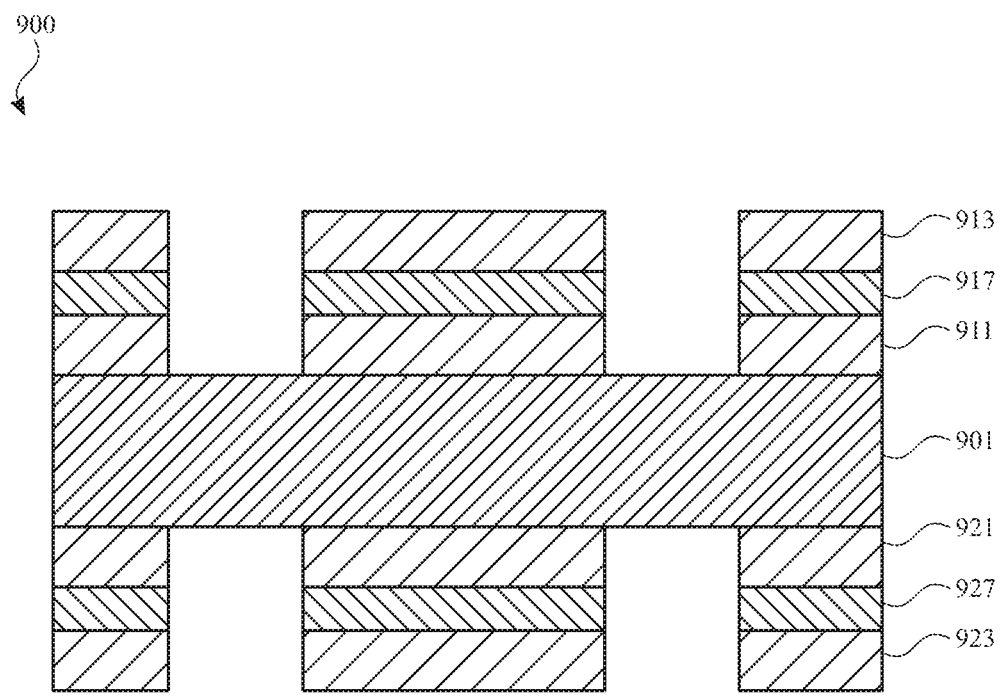
Figure 9I:
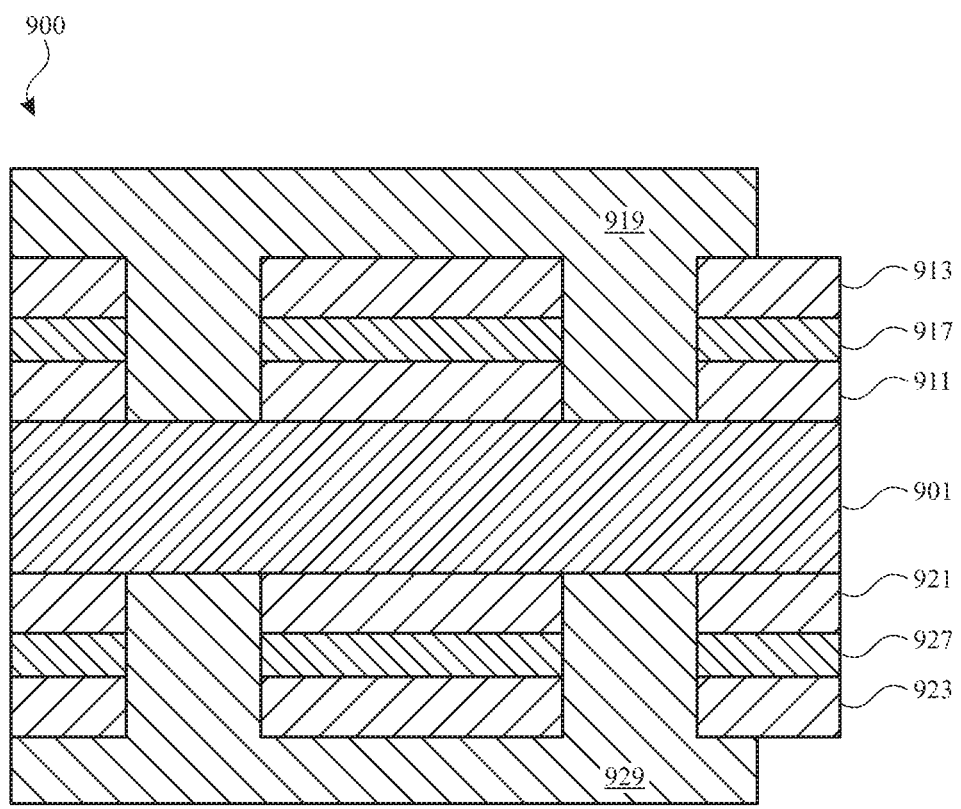

FIG. 9E illustrates forming an exemplary second electrode layer 920 according to examples of the disclosure. In some examples, second electrode layer 920 can include third conductive layer 921, fourth conductive layer 923, and second silver layer 927. Third conductive layer 921 and fourth conductive layer 923 can include a conductive material (e.g., ITO or another fully or partially transparent conductive material), for example. FIG. 9F illustrates patterning exemplary second and fourth conductive layers 913 and 923 of electrode stackup 900 according to examples of the disclosure. FIG. 9G illustrates patterning exemplary first and second silver layers 917 and 927 of electrode stackup 900 according to examples of the disclosure. FIG. 9H illustrates patterning first and third 911 and 921 electrode layers of electrode stackup 900 according to examples of the disclosure. FIG. 9I illustrates forming exemplary passivation layers 919 and 929 of electrode stackup 900 according to examples of the disclosure. First passivation layer 919 and second passivation layer 929 can include insulating and/or non-corrosive materials, for example.

In some examples, electrode stackup 900 can include additional or alternative components not illustrated in FIG. 8. For example, electrode stackup 900 can include oxide layers (e.g., one or more of oxide layers 709, 711, 713, 729, and/or 931) and/or optical layers (e.g., optical layer 715). In some examples, electrode stackup 900 can be formed using additional or alternative steps to those illustrated in FIGS. 9A-9I. In some examples, one or more steps illustrate in FIGS. 9A-9I can be performed in an order different from the order illustrated in FIGS. 9A-9I.

Some examples of the disclosure are related to a transparent conductor comprising: a layer of Zinc-Tin-Oxide (ZnSnO); and a layer of silver. Additionally or alternatively, in some examples the layer of ZnSnO is a first layer of ZnSnO, the transparent conductor further comprising: a second layer of ZnSnO, wherein the layer of silver is located between the first layer of ZnSnO and the second layer of ZnSnO. Additionally or alternatively, in some examples the second layer of ZnSnO has a thickness of in the range of 10-40 nanometers. Additionally or alternatively, in some examples the transparent conductor further includes a layer of Zinc Oxide (ZnO), wherein the layer of silver is located between the layer of ZnSnO and the layer of ZnO. Additionally or alternatively, in some examples the layer of ZnO has a thickness in the range of 1-4 nanometers. Additionally or alternatively, in some examples the transparent conductor further includes a layer of Silicon Dioxide ($SiO_2$), wherein the layer of silver is located between the layer of ZnSnO and the layer of $SiO_2$.

Additionally or alternatively, in some examples the layer of $SiO_2$ has a thickness in the range of 20-150 nanometers. Additionally or alternatively, in some examples the transparent conductor further includes a plastic substrate, wherein the layer of ZnSnO is located between the plastic substrate and the layer of silver. Additionally or alternatively, in some examples the layer of ZnSnO is a first layer of ZnSnO, and the transparent conductor further includes a second layer of ZnSnO; a layer of ZnO, the layer of ZnO located between the layer of silver and the second layer of ZnSnO; a layer of $SiO_2$, the layer of $SiO_2$ located such that the second layer of ZnSnO is located between the layer of $SiO_2$ and the layer of ZnO and a plastic substrate, wherein the first layer of ZnSnO is located between the plastic substrate and the layer of silver. Additionally or alternatively, in some examples the first layer of ZnSnO has a thickness in the range of 20-50 nanometers, the layer of silver has a thickness in the range of 3 to 12 nanometers, the layer of ZnO has a thickness in the range of 1-4 nanometers, the second layer of ZnSnO has a thickness in the range of 10-40 nanometers, and the layer of SiO2 has a thickness in the range of 20-150 nanometers. Additionally or alternatively, in some examples the layer of silver has a thickness in the range of 3 to 12 nanometers. Additionally or alternatively, in some examples the layer of ZnSnO has a thickness in the range of 20-50 nanometers. Additionally or alternatively, in some examples, the transparent conductor includes a layer of indium gallium zinc oxide (IGZO) located such that the silver layer is between the layer of IGZO and the layer of ZnSnO. Additionally or alternatively, in some examples, the transparent conductor further includes a plastic substrate, wherein the layer of ZnSnO has a thickness in the range of 20-50 nanometers, the layer of silver has a thickness in the range of 3-12 nanometers, and the layer of IGZO has a thickness in the range of 10-150 or 20-50 nanometers. Additionally or alternatively, in some examples the transparent conductor is included in a touch screen, the touch screen further comprising display circuitry and a plurality of touch electrodes, the transparent conductor is disposed between the display circuitry and the touch electrodes, and the transparent conductor is coupled to a shielding voltage. Additionally or alternatively, in some examples, the layer of silver comprises a silver alloy including on or more of bismuth, platinum, and nickel. Additionally or alternatively, in some examples, the transparent conductor further includes a layer of amorphous conductive material, wherein the layer of silver is located between the layer of ZnSnO and the layer of amorphous conductive material.

Some examples of the disclosure are related to a transparent conductor comprising: a layer of Indium-Tin-Oxide (ITO); a layer of Zinc-Tin-Oxide (ZnSnO); and a layer of silver located between the layer of ITO and the layer of ZnSnO. Additionally or alternatively, in some examples the transparent conductor further includes a layer of ZnO located between the layer of ITO and the layer of silver. Additionally or alternatively, in some examples the layer of ZnO has a thickness in the range of 1-4 nanometers. Additionally or alternatively, in some examples the transparent conductor further includes a plastic substrate, wherein the layer of ZnSnO is located between the plastic substrate and the layer of silver. Additionally or alternatively, in some examples the transparent conductor further includes a layer of ZnO located between the layer of ITO and the layer of silver; and a plastic substrate, wherein the layer of ZnSnO is located between the plastic substrate and the layer of silver. Additionally or alternatively, in some examples the layer of ITO has a thickness in the range of 10-50 nanometers, the layer of ZnO has a thickness in the range of 1-4 nanometers, the layer of silver has a thickness in the range of 3 to 12 nanometers, and the layer of ZnSnO has a thickness in the range of 10-50 nanometers. Additionally or alternatively, in some examples the layer of silver has a thickness in the range of 3 to 12 nanometers. Additionally or alternatively, in some examples the layer of ZnSnO has a thickness in the range of 10-50 nanometers. Additionally or alternatively, in some examples the transparent conductor is included in a touch screen, the touch screen further comprising display circuitry and a plurality of touch electrodes, the transparent conductor is disposed between the display circuitry and the touch electrodes, and the transparent conductor is coupled to a shielding voltage.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:
1. An electronic device comprising:
a transparent conductor comprising:
a layer of Zinc-Tin-Oxide (ZnSnO); and
a layer of silver;
one or more display pixels disposed in a first layer of a touch screen stackup of the electronic device; and a plurality of touch electrodes disposed in a second layer of a touch screen stackup of the electronic device, wherein:
the transparent conductor is disposed in a respective layer of the touch screen stackup of the electronic device, the respective layer between the first layer of the touch screen stackup that includes the one or more display pixels and the second layer of the touch screen stackup that includes the touch electrodes, and
the transparent conductor is coupled to a shielding voltage.

2. The electronic device of claim 1, wherein the layer of ZnSnO is a first layer of ZnSnO, the transparent conductor further comprising:
a second layer of ZnSnO, wherein the layer of silver is located between the first layer of ZnSnO and the second layer of ZnSnO.

3. The electronic device of claim 2, wherein the second layer of ZnSnO has a thickness of in the range of 10-40 nanometers.

4. The electronic device of claim 1, wherein the transparent conductor further comprises:
a layer of Zinc Oxide (ZnO), wherein the layer of silver is located between the layer of ZnSnO and the layer of ZnO.

5. The electronic device of claim 4, wherein the layer of ZnO has a thickness in the range of 1-4 nanometers.

6. The electronic device of claim 1, wherein the transparent conductor further comprises:
a layer of Silicon Dioxide ($SiO_2$), wherein the layer of silver is located between the layer of ZnSnO and the layer of $SiO_2$.

7. The electronic device of claim 6, wherein the layer of $SiO_2$ has a thickness in the range of 20-150 nanometers.

8. The electronic device of claim 1, wherein the transparent conductor further comprises:
a plastic substrate, wherein the layer of ZnSnO is located between the plastic substrate and the layer of silver.

9. The electronic device of claim 1, wherein the layer of ZnSnO is a first layer of ZnSnO, and the transparent conductor further comprises:
a second layer of ZnSnO;
a layer of ZnO, the layer of ZnO located between the layer of silver and the second layer of ZnSnO;
a layer of $SiO_2$, the layer of $SiO_2$ located such that the second layer of ZnSnO is located between the layer of $SiO_2$ and the layer of ZnO; and
a plastic substrate; wherein the first layer of ZnSnO is located between the plastic substrate and the layer of silver.

10. The electronic device of claim 9, wherein:
the first layer of ZnSnO has a thickness in the range of 20-50 nanometers,
the layer of silver has a thickness in the range of 3 to 12 nanometers,
the layer of ZnO has a thickness in the range of 1-4 nanometers,
the second layer of ZnSnO has a thickness in the range of 10-40 nanometers, and
the layer of $SiO_2$ has a thickness in the range of 20-150 nanometers.

11. The electronic device of claim 1, wherein the layer of silver has a thickness in the range of 3 to 12 nanometers.

12. The electronic device of claim 1, wherein the layer of ZnSnO has a thickness in the range of 20-50 nanometers.

13. The electronic device of claim 1, wherein the transparent conductor further comprises:
a layer of indium gallium zinc oxide (IGZO) located such that the silver layer is between the layer of IGZO and the layer of ZnSnO.

14. The electronic device of claim 13, wherein the transparent conductor further comprises:
a plastic substrate, wherein
the layer of ZnSnO is located between the plastic substrate and the layer of silver,
the layer of ZnSnO has a thickness in the range of 20-50 nanometers,
the layer of silver has a thickness in the range of 3-12 nanometers, and
the layer of IGZO has a thickness in the range of 20-50 nanometers.

15. The electronic device of claim 1, wherein the layer of silver comprises a silver alloy including on or more of bismuth, copper, platinum, and nickel.

16. The electronic device of claim 15, wherein the silver alloy is gradient-doped.

17. The electronic device of claim 1, wherein the transparent conductor further comprises:
a layer of amorphous conductive material, wherein the layer of silver is located between the layer of ZnSnO and the layer of amorphous conductive material.

18. An electronic device comprising:
a transparent conductor comprising:
a layer of Indium-Tin-Oxide (ITO);
a layer of Zinc-Tin-Oxide (ZnSnO); and
a layer of silver located between the layer of ITO and the layer of ZnSnO;
one or more display pixels disposed in a first layer of a touch screen stackup of the electronic device; and
a plurality of touch electrodes disposed in a second layer of the touch screen stackup of the electronic device, wherein:
the transparent conductor is disposed in a respective layer of the touch screen stackup of the electronic device, the respective layer between the first layer of the touch screen stackup that includes the one or more display pixels and the second layer of the touch screen stackup that includes the touch electrodes, and
the transparent conductor is coupled to a shielding voltage.

19. The electronic device of claim 18, wherein the transparent conductor further comprises:
a layer of ZnO located between the layer of ITO and the layer of silver.

20. The electronic device of claim 19, wherein the layer of ZnO has a thickness in the range of 1-4 nanometers.

21. The electronic device of claim 18, wherein the transparent conductor further comprises:
a layer of ZnO located between the layer of ITO and the layer of silver; and
a plastic substrate, wherein the layer of ZnSnO is located between the plastic substrate and the layer of silver, wherein:
the layer of ITO has a thickness in the range of 10-50 nanometers,
the layer of ZnO has a thickness in the range of 1-4 nanometers,
the layer of silver has a thickness in the range of 3 to 12 nanometers, and
the layer of ZnSnO has a thickness in the range of 10-50 nanometers.

22. The electronic device of claim 18, wherein the layer of silver has a thickness in the range of 3 to 12 nanometers.

23. The electronic device of claim 18, wherein the layer of ZnSnO has a thickness in the range of 10-50 nanometers.

\* \* \* \* \*

UNITED STATES PATENT AND TRADEMARK OFFICE
CERTIFICATE OF CORRECTION

PATENT NO. : 10,901,543 B1
APPLICATION NO. : 16/145034
DATED : January 26, 2021
INVENTOR(S) : Khadijeh Bayat et al.

Page 1 of 1

It is certified that error appears in the above-identified patent and that said Letters Patent is hereby corrected as shown below:

In the Claims

In Column 21, Line 21, in Claim 3, after "thickness" delete "of".

In Column 22, Line 18, in Claim 15, delete "on" and insert --one--.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*